INVENTOR.
Howard E. Mathes

BY Fredrick H. Braun

ATTORNEY

Jan. 19, 1971  H. E. MATHES  3,555,771
BUNDLING MACHINE
Filed Oct. 15, 1968  10 Sheets-Sheet 3
Fig. 4
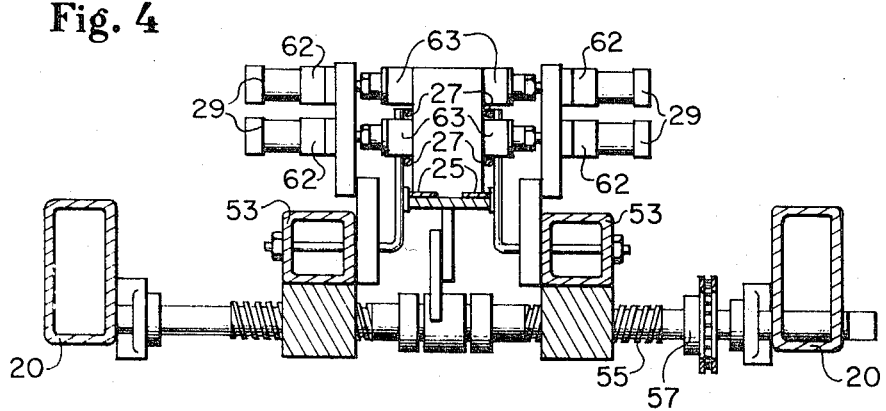
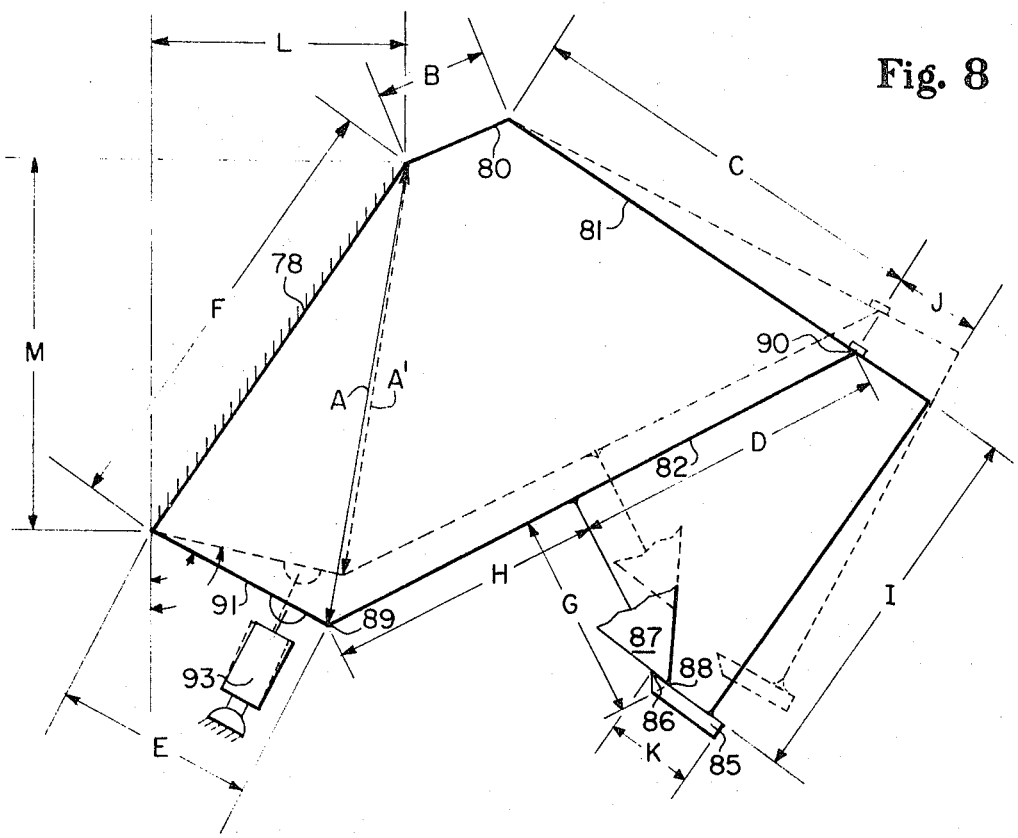
Fig. 8
*INVENTOR.*
Howard E. Mathes
BY *Fredrick H. Braun*
ATTORNEY

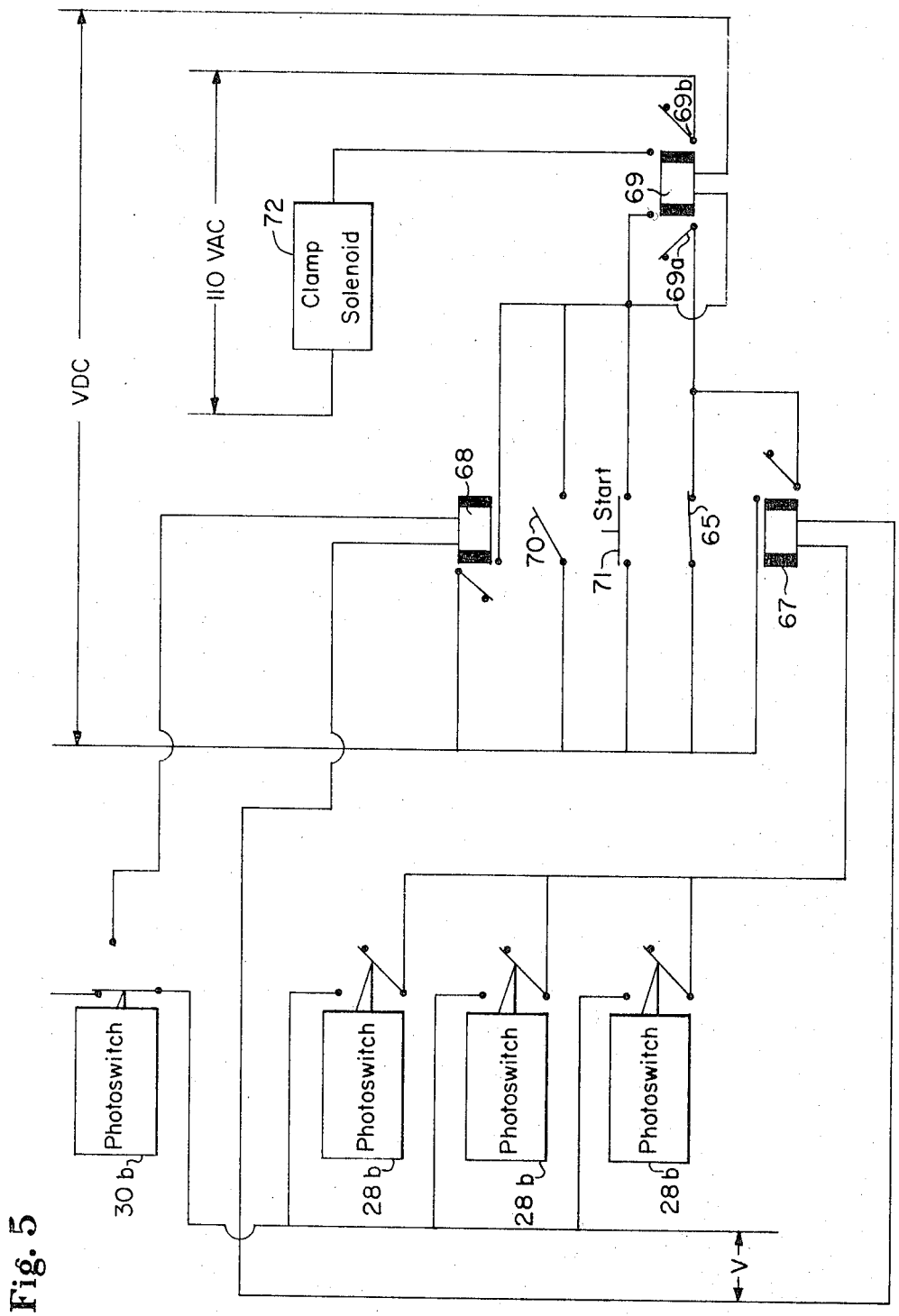

Jan. 19, 1971     H. E. MATHES     3,555,771
BUNDLING MACHINE
Filed Oct. 15, 1968     10 Sheets-Sheet 5
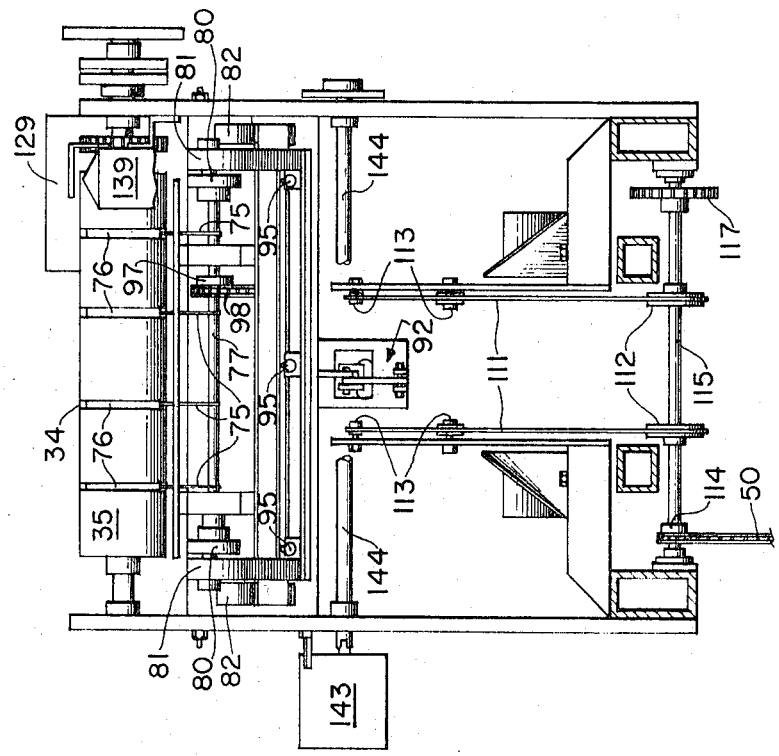
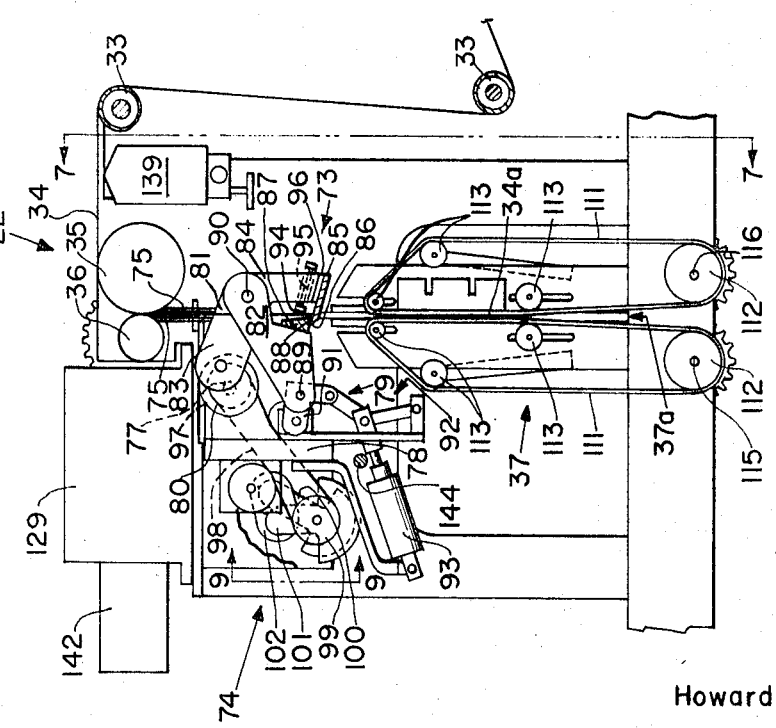
INVENTOR.
Howard E. Mathes
BY *Fredrick H. Braun*
ATTORNEY Jan. 19, 1971  H. E. MATHES  3,555,771
BUNDLING MACHINE Filed Oct. 15, 1968  10 Sheets-Sheet 6

INVENTOR.
Howard E. Mathes

BY Fredrich H. Braun

ATTORNEY

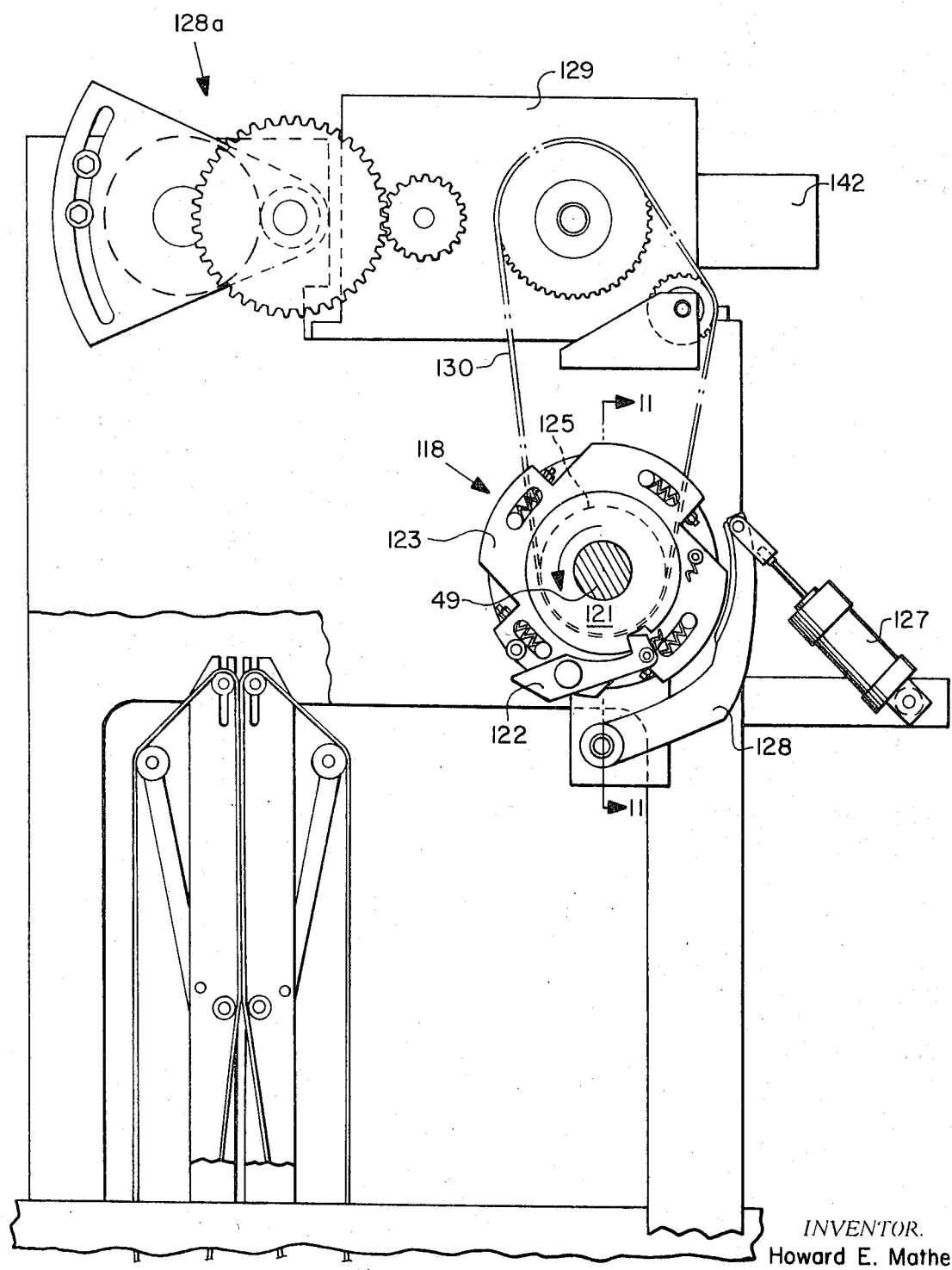

Jan. 19, 1971 — H. E. MATHES — 3,555,771
BUNDLING MACHINE
Filed Oct. 15, 1968 — 10 Sheets-Sheet 8

INVENTOR.
Howard E. Mathes
BY Fredrick H. Braun
ATTORNEY

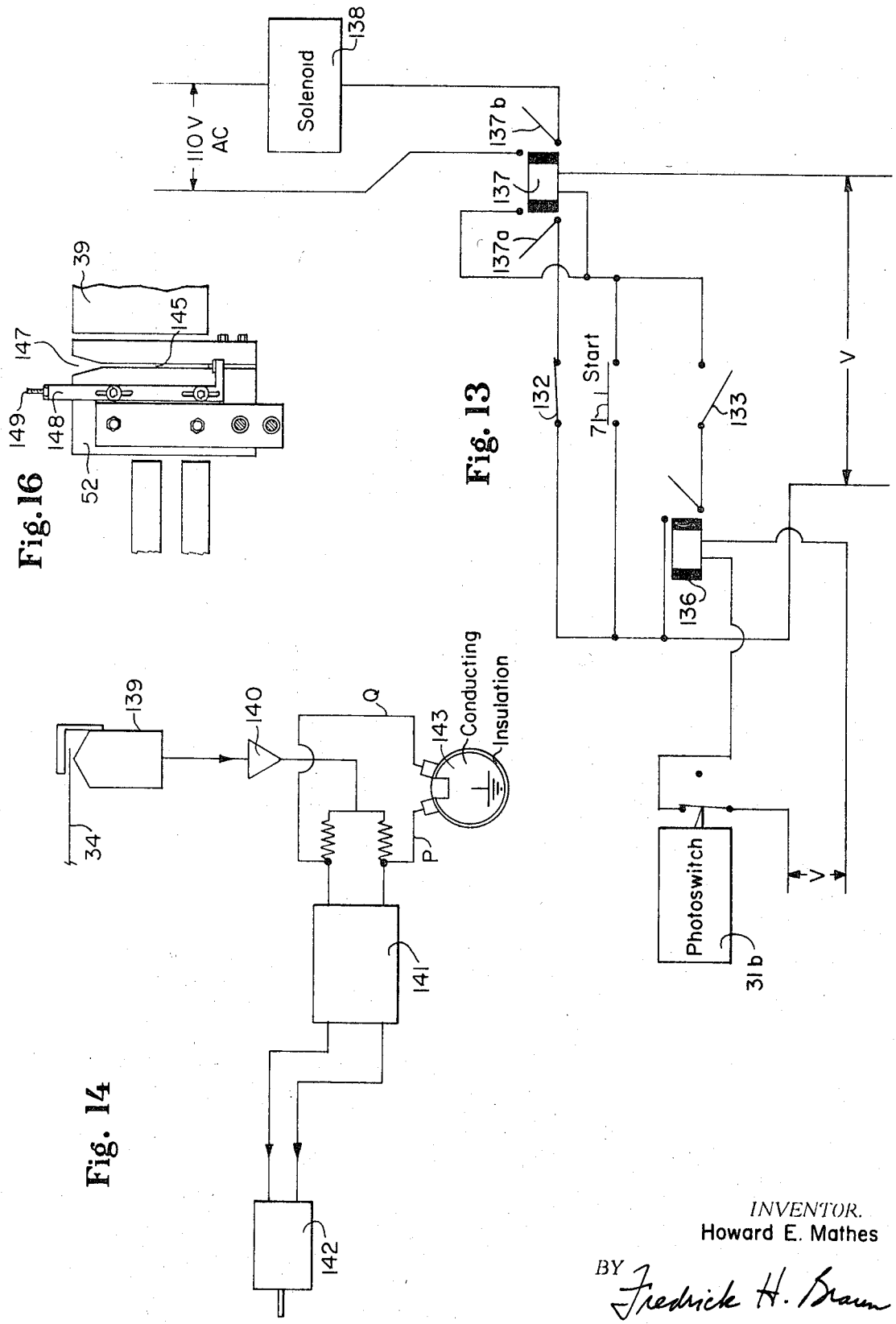

United States Patent Office 3,555,771
Patented Jan. 19, 1971

3,555,771
BUNDLING MACHINE
Howard E. Mathes, Harlan Township, Warren County, Ohio, assignor to The Procter & Gamble Company, Cincinnati, Ohio, a corporation of Ohio
Filed Oct. 15, 1968, Ser. No. 767,738
Int. Cl. B65b 57/12, 13/00
U.S. Cl. 53—73                                                                11 Claims

ABSTRACT OF THE DISCLOSURE

A machine for bundling individual articles into groups, which machine includes one or more of the following features (1) a system whereby groups of articles are sequentially clamped between clamps and released to automatically arrange the articles into 2, 3, 4 or more article groupings, (2) a system whereby wrappers are fed so that their narrow dimension is the cutoff length, (3) a system whereby a wrapper is brought to rest against fixed stops before it is folded around the articles to be bundled, and (4) a cutoff knife comprising a four bar linkage in which one pivot point can be shifted to shorten the effective length of one bar of the linkage and render the knife inactive.

FIELD OF THE INVENTION

This invention relates to packaging machinery and more particularly to such machines which are adapted to group soap bars into a group comprising a preselected number of bars and tape or wrap the bars in a group together.

BACKGROUND OF THE INVENTION

Marketers of soap bars, products contained in rectangular cartons, and similar articles often desire to promote particular products by securing them in bundles comprising a multiple of the basic units and selling them at a group price. These groups are most efficiently marketed if the grouping and wrapping is done at the factory before the product is released into the channels of trade. To prepare these bundles for shipment to the trade, it is preferable that a machine be available which can accept individual basic units directly from the packing lines and secure them in bundles, of for example, 2, 3, or 4 basic units. For maximum efficiency, this requires that the bundling machine be capable of performing its operations at the high speeds which are presently common to consumer product packing lines.

Bundling machines are presently commercially available; however, those available have certain features which limit the line speed at which they can operate. These features include means for grouping the articles to be bundled, the manner in which the tape or wrapper is fed to the bundle; and problems with starting and stopping certain parts of the machines in response to situations where infeed continuity is broken.

OBJECTS OF THE INVENTION

It is therefore an object of this invention to provide a bundling machine which is capable of increased production rates.

A further object is to provide a bundling machine wherein the cyclic functions are performed in a manner requiring overcoming a minimum of inertial forces as machine components are intermittently actuated.

A still further object of this invention is to provide a bundling machine with a tape or wrapper feed system which supplies wrappers in a direction parallel to their smallest dimension, thereby reducing tape feed speed relative to line speed.

It is a still further object to provide a bundling machine wherein the tape is brought to a complete stop against fixed stops before it is applied to the articles to be bundled thereby minimizing misregistration of the tapes on the bundles.

SUMMARY OF THE INVENTION

Briefly stated, this invention is a bundling machine comprising a structural framework, a conveyor system mounted to said framework, means for cutting individual wrappers or tapes from a printed web and depositing them in a pickup station on a conveyor, means for grouping individual articles into bundles and releasing the bundles to the pickup station in timed relation with the deposit of tapes therein, and means for applying the wrappers or tapes to the bundles and securing them thereto. Additionally, the invention includes one or more of the following features: (1) means for grouping the articles into bundles comprising a pair of clamps oppositely disposed on each side of a continuously running infeed conveyor and control means for alternatively opening and closing the clamps in response to (a) a timed signal calling for release of a bundle to the wrapper pickup station and (b) a signal indicating that a group of articles sufficient to form another bundle is between the clamps; (2) means for feeding the wrapper or tape web in a direction parallel to the shortest dimension of an individual tape and depositing the cut wrapper or tape laterally across the conveyor in the pickup station; (3) a pickup station which includes fixed stops against which a wrapper or tape can come to rest and means for timing the release of bundles to the pickup station so that the wrapper or tape comes to rest in the pickup station before the bundle picks it up; and (4) a cutting knife comprising a four bar linkage in which the effective length of one bar can be varied by moving a pivot point, thereby preventing the knife blade and shear bar from coming together so as to render the knife inoperable without stopping motion of its parts.

BRIEF DESCRIPTION OF THE DRAWINGS

While the specification concludes with claims particularly pointing out and distinctly claiming the invention, it will be more readily understood by reference to the following explanation and accompanying drawings in which:

FIG. 4 is a sectional view taken along line 4—4 of FIG. 3;

FIG. 5 is a diagrammatic view showing the electrical control circuit for the machine's infeed section;

FIG. 6 is a sectional view on an enlarged scale taken along line 6—6 of FIG. 2;

FIG. 7 is a sectional view taken along line 7—7 of FIG. 6;

FIG. 8 is a diagrammatic view of a knife assembly;

FIG. 10 is an elevation view of the back side of the apparatus appearing in FIG. 6;

FIG. 13 is a diagrammatic view of an electric circuit for controlling the machine's wrapper feed section;

FIG. 14 is a diagrammatic view of the control system for controlling wrapper or tape registration on the machine;

FIG. 16 is a sectional view taken along line 16—16 of FIG. 15.

DESCRIPTION OF THE PREFERRED EMBODIMENT

Figure 1:
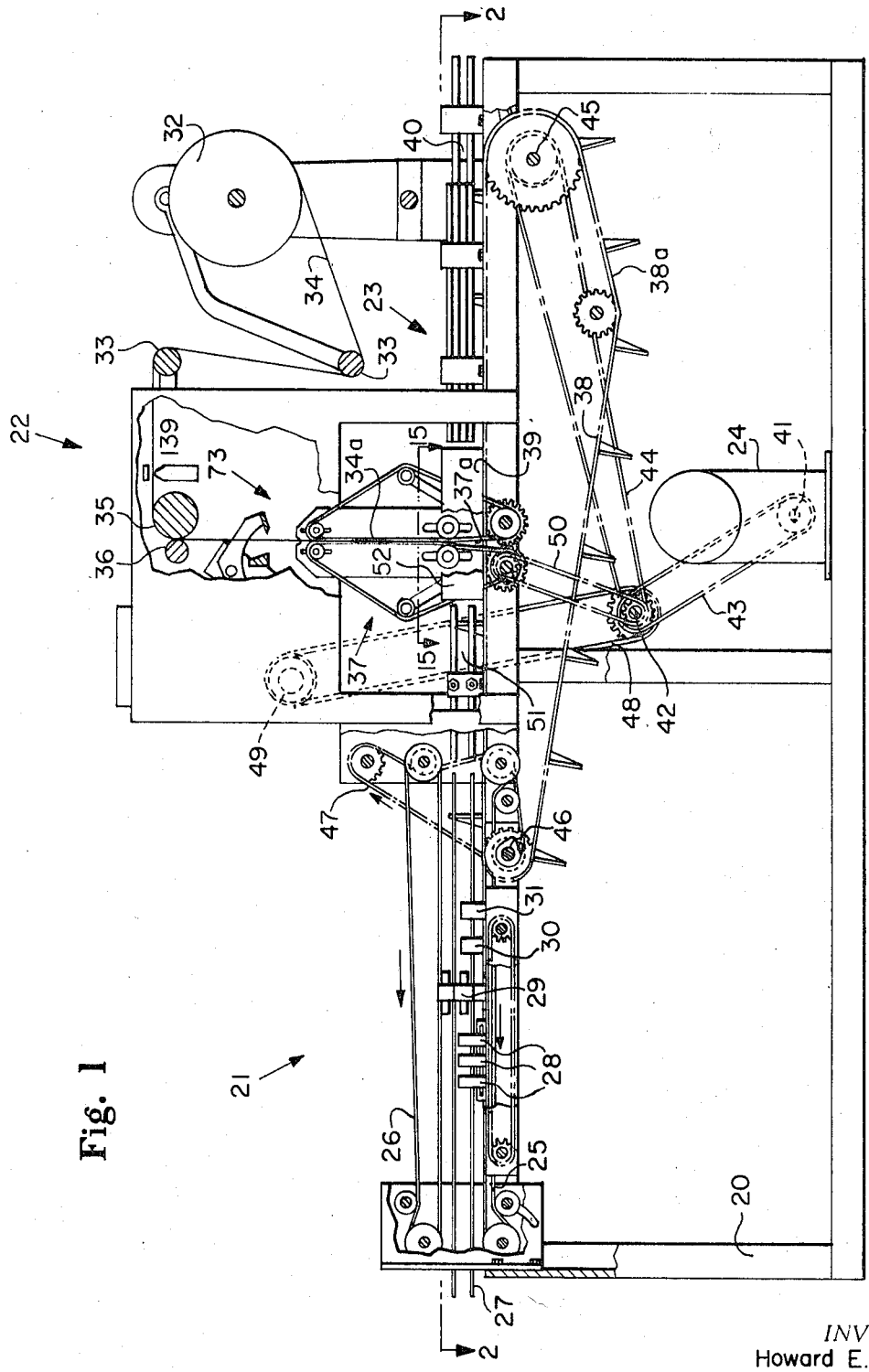
FIG. 1 is a partially fragmented elevation view of a soap bar bundling machine.

Referring to the drawings, FIG. 1 is a partially fragmented view of the bundling machine with certain of the structural members removed to illustrate the relationship of the operative mechanisms and the drive arrangement. The machine comprises generally a structural frame 20, an infeed section 21, a tape (or wrapper) feed section 22, a sealing section 23, and drive unit 24.

Included in the infeed section 21 are a pair of conveyor belts 25 (both belts 25 can be seen by reference to FIG. 2, which in connection with explanatory text below illustrates the lateral relationship of the parts), an upper belt 26 whose position is vertically adjustable to accommodate various sized articles, e.g., wrapped soap bars, guide rails 27, sensors 28, clamps 29, sensor 30, and sensor 31. The structural and functional interrelationship of clamps 29 and sensors 28, 30 and 31 is detailed below.

The tape feed section, which is explained in more detail below, includes a spool 32 containing a printed roll of tapes or wrappers having their longest dimension parallel to the axis of the spool 32 and transverse of the conveyor belts 25; idlers 33 to support the tape (or wrapper) web 34, means for controlling tension in web 34, a measuring roll 35 and compression roll 36, knife assembly 73 for cutting the tapes from the web 34, and a belt system 37 for placing the tapes in the pickup station 37a.

The sealing section comprises a conveyor 38 having several flights 38a to accept the groups of bars from infeed conveyor 25 and carry them through the tape feed section 22 and sealing section 23, a heating unit 39 to heat-seal the tape to the individual bars in a group, and a brush 40 to smooth the tapes and press them against the bars in the group.

The drive unit 24 is preferably a variable speed unit powered by an electric motor. Power is transmitted from the drive unit 24 to the operating mechanisms of the machine by a series of belt and pulley or chain and sprocket combinations. As shown in FIG. 1, power is transmitted from the output shaft 41 to line shaft 42 by chain 43 and from line shaft 42 to the various conveyors and mechanisms. Power is transmitted to the conveyor system by chain 44 from line shaft 42 to driven shaft 45 of conveyor 38. Infeed conveyor belts 25 and upper belt 26 are driven from conveyor 38 shaft 46 by the drive system comprising chain 47. Chain 48 delivers power from line shaft 42 to the tape feed section 22 input shaft 49, and chain 50 delivers power from line shaft 42 to transfer system 37.

Figure 2:
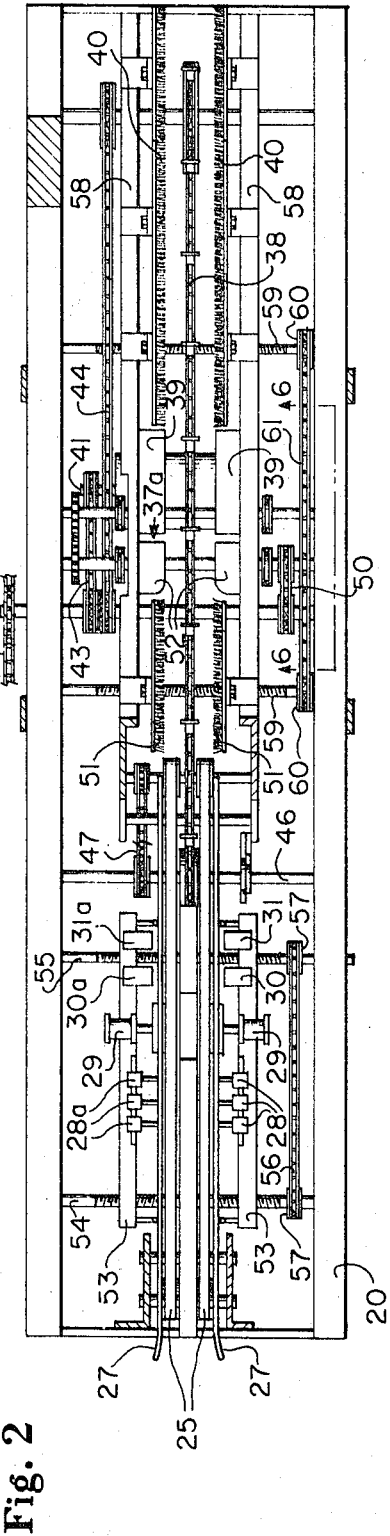
FIG. 2 is a sectional view taken along line 2—2 of FIG. 1.

FIG. 2 shows the lateral relationship of the parts and shows more detail in the conveyor sections. The conveyors are arranged such that lower infeed conveyor belts 25 are spaced sufficiently to allow the sealing section conveyor 38 to run between them, thus allowing smooth transfer of the soap bars from the infeed conveyor 25 to the sealing section conveyor 38.

Soap bars are laterally retained on the infeed conveyor belts 25 by the guide rails 27 and are laterally retained on the conveyor 38 by guide brushes 51, guides 52, heating units 39, and brushes 40. Brushes 40 and 51 have a configuration similar to that of an ordinary scrub brush and have bristles of moderate stiffness.

To accommodate soap bars of varying dimensions, means are provided to adjust the space between guide rails 27 and the corresponding space between the guide means associated with conveyor 38. In the infeed section 21, this adjusting means comprises mounting rails 53 which are secured to lead screws 54 and 55, the lead screws 54 and 55 being constrained to rotate in unison by chain 56 and sprockets 57. Guide rails 27, clamps 29 and sensors 28, 30 and 31 are mounted on rails 53 so that when lead screws 54 and 55 are rotated the entire system of infeed section 21 components moves inwardly or outwardly.

Lateral separation of the guide means associated with conveyor 38 is similarly adjusted by means of mounting rails 58 secured to lead screws 59, which are constrained to rotate together by sprockets 60 and chain 61.

In operation, wrapped soap bars are passed into the infeed section 21 where they are grouped into groups of, for example, three bars and released into conveyor 38. Simultaneously, the tape 34 is being measured out by the measuring roll 35 and cut to the proper width in the tape feed section 22. The cut tape 34a is then passed into the transfer section 37 where it is carried down against a stop into the path of the soap bars immediately before they reach the tape. Thereupon, the tape 34a is folded round three sides of the group of bars and the bundle passes through the sealing section 23, where the tape is heat-sealed to the bars by heating unit 38 and pressed tightly to the bars by brushes 40. The completed bundle is then discharged from conveyor 38 and carried by another conveyor (not shown) to a packing station to be packed for shipment.

With the overall description of the structure and operation of the machine established, the various functional sections of the machine are explained in more detail below.

INFEED SECTION

General hardware description

Figure 3:
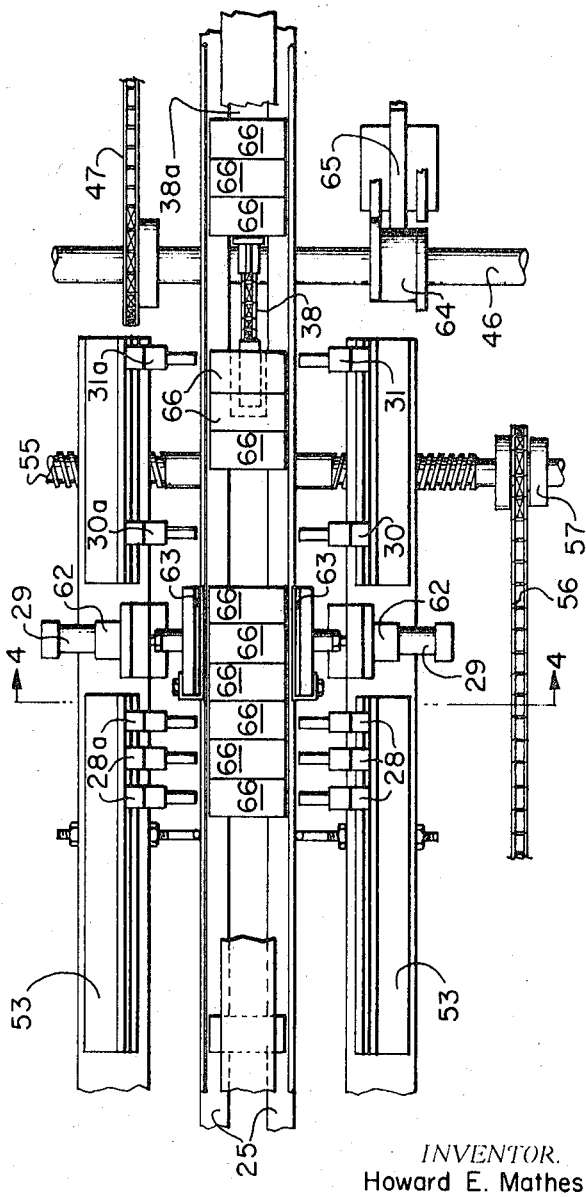
FIG. 3 is a partial plan view on an enlarged scale of the infeed section of the machine of FIG. 1.

FIG. 3 partially illustrates the infeed section and shows the hardware which groups the soap bars into groups having the desired number of bars for a bundle. The grouping and sorting mechanism comprises two opposed pairs of clamps 29 (see also FIG. 4 ) which are actuated in response to electrical signals originating with photoelectric sensors 28 and 30. The clamps 29 comprise air cylinders 62 which are caused to actuate inwardly or outwardly by a solenoid operated air valve (not shown in FIGS. 3 and 4, illustrated schematically in FIG. 5) and pads 63 which grip the soap bars to prevent them from moving with the continuously running belts 25.

Electrical hardware

The electrical hardware which controls actuation of clamps 29 comprises a plurality of override switches which include photocells 28 and corresponding light sources 28a, a reset switch which includes photocell 30 and light source 30a, a switch 65 which is actuated by cam 64 on shaft 46 when the flights 38a on conveyor 38 are in a position such that the released group of bars 66 will reach the conveyor 38 at the proper time to be received in flights 38a. This is accomplished by rotationally adjusting cam 64 to actuate switch 65 at the appropriate shaft 46 position.

The photocells 28 and 30 and corresponding light sources 28a and 30a are part of four integrated photoswitch units which additionally comprise amplifiers to amplify the electrical signal generated in the photocells by their corresponding light source and relay actuated switches to effectuate the desired responses of the clamp 29 control circuitry to the presence or absence of bars in the path of light beams between the photocells and their corresponding light sources. Such photoswitch units are available as standard commercial units, such as Autotron Model #A725.

Also shown in FIG. 3 are photocell 31 and corresponding light source 31a which are part of an integrated photoswitch unit as described above. Photocell 31 is not a functional part of the clamp 29 control, but is a part of the control system for the tape feed section 22. Hence, further discussion pertaining to photocell 31 is left to the detailed description below thereof.

Electrical circuit description

FIG. 5 is an electrical schematic of the clamp 29 control system. The system comprises photoswitches 28b and 30b (so designated to correspond to photocells 28 and 30, respectively, shown in FIG. 3), normally open relay 67, normally open relay 68, relay 69 (which had two normally open contacts 69a and 69b), override switch 70, pushbutton switch 71, cam 64, actuated switch 65, and clamp 29 solenoid 72 (which actuates the air valve controlling the clamps 29). Three photoswitches 28b are shown, which is the number required when three-bar bundles are to be arranged. If bundles having more or less bars are to be arranged, a number of photoswitches 28b equal to the number of bars per group is used, and the photoswitches 28b are connected in parallel as shown in FIG. 5.

Operation and functioning of infeed section

Before the machine is started, it is set up by placing a number of bars 66 between clamps 29 and an equal number of bars immediately upstream of clamps 29 as shown in FIG. 3. With this set up, bars 66 will prevent light sources 28a from reaching photocells 28 and cause photoswitches 28b to assume the open circuit positions shown in FIG. 5. At this time, the contacts on relays 67, 68 and 69 are open as are switches 70 and 71. Hence, no power is being supplied to clamp solenoid 72 and clamps 29 remain open. Additionally, switch 65 is in its normally closed position, unless flights 38a on a conveyor 38 are in a position to accept a group of bars 66.

When the machine is started, switch 71 is momentarily closed, which provides current to relay 69, thereby closing contacts 69a and 69b. This creates two simultaneous effects: (1) current is provided to clamp solenoid 72 through contact 69b and (2) relay 69 is locked in by the closed circuit through switch 65 and contacts 69a, which maintains relay 69 in an energized state after start switch 71 is released. Thus clamps 29 retain the initial group of bars in their set-up position until the next step in the control sequence takes place.

The next step is relase of the initial group of bars 66 from the clamps 29 to be conveyed as a group to conveyor 38. This step is initiated when cam 64 opens switch 65 as flights 38a come into proper position to receive the group. Opening switch 65 breaks the locking circuit on relay 69, opening contacts 69b, thereby deenergizing solenoid 72 and allowing clamps 29 to release the initial group of bars 66.

As soon as the first group of bars 66 clears clamps 29, the light beam is broken to photoswitch 30b (which is shown in the contact position at startup, i.e., light is reaching photocell 30 from source 30a). This causes photoswitch 30b to close the circuit through contacts 69b and actuating clamps 29 on the second group of bars. Simultaneously, relay 69 is again locked in through contact 69a and switch 65. The first group of bars passes onto conveyor 38 and the second group of bars remains in clamps 29 to await release in repetition of the control cycle.

The cycle described above will repeat itself as long as there is an adequate number of bars immeditaely upstream of the clamp 29 to form the next group. If there is an insufficient number of bars 66 correctly positioned to enter the clamps 29 immediately behind those scheduled to be released, the circuit comprising photoswitches 28b will override the effects of opening of switch 65 and preclude release of the bars 66 in clamp 29 until a sufficient number of bars 66 accumulate. In such a case, one of the photocells 28 will receive light from its corresponding source 28a and cause photoswitch 28b to close, thereby closing the circuit to relay 67. This provides a closed circuit to relay 69 which is in parallel to the circuit incorporating switch 65 so that opening switch 65 will have no effect on the energization of relay 69.

During the clamping and unclamping sequence described above, the belts 25 are continuously running at constant speed. Thus a system for automatically grouping soap bars or other articles has been provided in which all parts subject to dynamic change during the grouping cycle have a relatively low inertia. This is particularly advantageous in that it permits higher operating speeds than are possible for other systems such as one wherein conveyor speed is varied to provide the necessary timing.

TAPE FEED SECTION

General description

Figure 9:
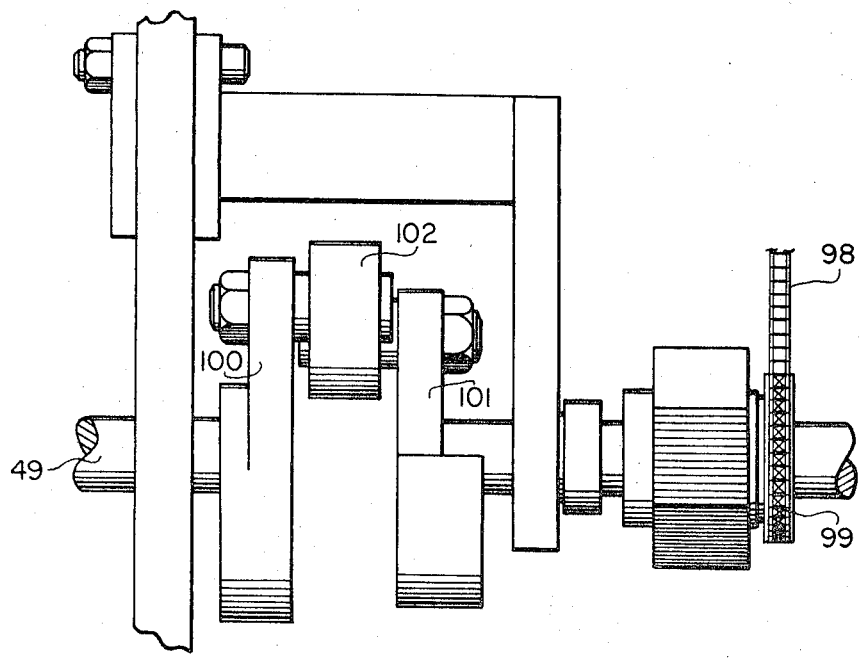
FIG. 9 is a sectional view taken along line 9—9 of FIG. 6.

FIG. 6 is a partially fragmented section showing the internal mechanisms of the tape feed section 22 and FIG. 7 is a partial elevation showing the same. FIG. 8 is a diagram of the kinematics of the knife assembly and FIG. 9 is included to provide more detail on the cutting knife drive system (hereinafter described in detail), and FIG. 10 is an elevation view showing the tape feed section 22 drive train.

Referring specifically to FIGS. 6 and 7, the tape feed section 22 comprises measuring roll 35 and compression roll 36, knife assembly 73, knife drive assembly 74, and transfer system 37. Included also are guide bars 75 which tract in grooves 76 (see FIG. 7) on the measuring roll 35 and compression roll 36, the function of bars 75 being to guide the tape web 34 from the measuring roll 35 into the knife assembly 73.

Knife assembly

The knife assembly 73 comprises a laterally spaced pair of identical four bar linkages in which the effective length of the fixed link can be automatically adjusted to one of two different lengths and which support the cutting members of the knife. The four bar mechanisms are driven from a common shaft 77 which is journaled to support structure 78, and the effective length of the fixed link in the identical four bar mechanisms is changed by the movable pivot mechanism 79.

Each four bar mechanism comprises a crank 80 secured to shaft 77, a cutter link 81 pivotally connected to crank 80, a support link 82 pivotally connected to cutter link 81, and movable pivot mechanism 79 which is secured to support structure 78 and is pivotally connected to support link 82.

Cutter link 81 includes a straight section 83 extending from its pivotal connection with crank 80 to its pivotal connection with support link 82 and an angled extension 84 extending at an angle with section 83 from the connection with support link 82. Extension 84 is designed to support a knife blade 85 and has a length and orientation such that knife blade 85 can be mounted to cutter links 81 in a position where its leading edge 86 will overlap the shear bar 87 (which is mounted on support link 82) as shown in FIG. 6 when the four bar mechanism is in the closed position of its cycle.

Support link 82 comprises a mechanical link having a heavy section extending to its lower side which is adapted to support shear bar 87. Shear bar 87 is secured at its ends to the spaced pair of support links 82 such that its leading edge 88 lies in a position approximately equidistant from pivot points 89 and 90 on support link 82.

The movable pivot mechanism 79 comprises lever 91 which is secured to a shaft which is commonly secured to the opposite lever 91 and is journaled to support structure 78 and which is pivotally connected to support link 82 at pivot point 89, linkage 92 which is connected to a lever secured to the lever 91 shaft and is connected to support structure 78, and a two-position, air-operated actuator 93 which is pivotally connected to linkage 92 and to support structure 78. When actuated, actuator 93 through linkage 92 will cause levers 91 to rotate with respect to structure 78, thereby shortening the distance between point 89 and the shaft 77 to which crank 80 is secured (i.e., shortening the length of the fixed link of the four bar linkage, the four bars comprising crank 80, links 81 and 82, and a fixed link having the dimension A or A' as shown in FIG. 8 which results from the combination of support structure 78 and movable pivot mechanism 79). This will cause, as explained below, the travel of blade 85 to fall short of shear bar 87 so that knife assembly 73 is rendered inactive (see the dotted outline of FIG. 8). Activation of actuator 93 is explained in detail below in connection with discussion concerning controls for tape feed section 22.

To provide for clean cutting action, the knife assembly 73 includes a clamping bar 94 which clamps the tape web 34 between bar 94 and shear bar 87 immediately before and during cutting to stop all relative motion between web 34 and the knife cutting edges. Clamp bar 94 is secured to rods 95 which are slideably mounted in two brackets fastened to blade support bar 96. Rods 95 are spring-loaded against stops such that immediately before blade 85 contacts web 34, bar 94 presses web 34 against shear bar 87.

The kinematics of the knife assembly 73 are such that during the cutting portion of its cycle the blade 85 and shear bar 87 are moving downwardly at a speed equal to or slightly less than the linear speed of the tape web 34. FIG. 8 diagrammatically illustrates dimensional relationships which will provide adequate downward motion of the knife during cutting over a tape feed linear speed range of from about 300 to about 650 inches per minute. Also illustrated are the relative positions of blade 85 and shear bar 87 upon actuation of actuator 93. To achieve the performance requisites of the knife assembly 73, the dimensions can be, for example, A=3.094 inches when the knife assembly 73 is in its active position, B=.724 inch, C=2.890 inches, D=1.875 inches, E=1.375 inches, F=3.122 inches, G=.859 inch, H=2.315 inches, I=2.703 inches, J=2.0 inches, K=.313 inch, L=1.797 inches, and M=2.562 inches. Proportionate dimensional relationships will achieve the same results, and other appropriate linkages can also be determined by graphical or mathematical kinematic analysis, the techniques for which are familiar to persons skilled in mechanical design.

The knife assembly described is particularly advantageous in high speed machines of the type described in that, by actuating actuator 93, the cutting action of the knife can be stopped without stopping motion of the parts. Thus, the inertia of the moving parts need not be overcome to halt the cutting action, as, for example, when no bars are being supplied to the tape feed section 22, and similarly, inertia need not be overcome to restart the cutting action.

Knife drive assembly

Referring back to FIG. 6, the knife assembly 73 is driven at sprocket 97, which is secured to shaft 77, by chain 98 which in turn is driven by sprocket 99 on knife drive assembly 74. The knife drive assembly is a drag link assembly comprising input crank 100, output crank 101 and drag link 102 connecting the ends of the input and output cranks. The lateral relationship of the knife drive assembly parts is shown in FIG. 9.

Input crank 100 is driven by the tape feed section 22 power input shaft 49, which is driven at a fixed speed relative to the conveyors 25 and 38, and is nonconcentric with and somewhat longer than crank 101. Thus, the rotational speed of output crank 101 (and sprocket 99) varies with respect to that of crank 100 and is dependent on the position of the knife drive assembly 74 in its cycle.

This device permits ready adjustment of the downward speed of the knife assembly 73 relative to the linear speed of tape web 34. When the machine is initially set up for bundling a specific product, tape web 34 speed in relation to line speed is determined by the width dimension of a single tape 34a so that a tape 34a is scheduled to be placed in a pickup station 37a in time with the arrival of a flight 38a on a conveyor 38 at station 37a. To properly cut tape 34a from web 34, knife assembly 73 must therefore possess the same linear speed relationship with line speed as that of web 34. This is determined by the position of knife drive assembly 74 in its cycle when knife assembly 73 is in the cutting portion of its cycle. The relation between knife drive assembly 74 position and knife assembly 73 position is adjusted by means which are provided for rotationally adjusting the position of sprockets 97 and/or 99 on their shafts. Alternatively, the knife drive assembly 74 to knife assembly 73 relation can be adjusted by removing chain 98, repositioning knife assembly 74 in its rotational cycle relative to the position of knife assembly 73 in its cycle, and replacing chain 98.

Tape transfer assembly

Referring back again to FIGS. 6 and 7, the transfer assembly 37 can be seen. The assembly comprises two laterally spaced pairs of transfer belts 111, drive pulleys 112, and idlers 113. The belts 111 in each pair are adjacent each other in the upper part of transfer assembly 37 and diverge from each other in the lower part thereof. Thus, after a tape 34a has been cut by the knife assembly 73, it is dropped a small distance (e.g., ⅛") into transfer assembly 37 and is carried to the pickup station 37a and released from belts 111 as they diverge.

Power is supplied to the transfer system 37 by chain 50 as described above in connection with FIG. 1. Chain 50 transmits power through sprocket 114 to rearward shaft 115 and forward transfer assembly shaft 116 is driven from rearward shaft 115 by a pair of equally sized gears 117.

Tape feed section controls

Figure 11:
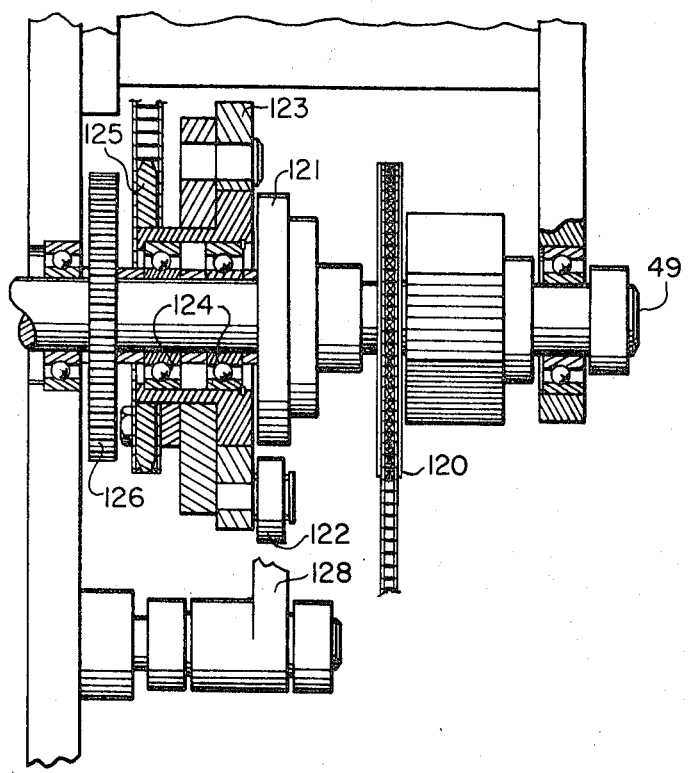
FIG. 11 is a sectional view taken along line 11—11 of FIG. 10.

FIGS. 6 and 7 additionally illustrate the location of control hardware used to stop action in the tape feed section 22 when bars are not being supplied to pickup station 37a and to position the tape web 34 properly for cutoff by knife assembly 73. Also relevant in this connection is FIG. 10. FIG. 11 is included to show the tape feed clutch in detail, FIG. 12 shows a timing cam and switch assembly, FIG. 13 illustrates the control system for the tape feed stop action mechanism, and FIG. 14 schematically illustrates the tape registration control system.

Figure 12:
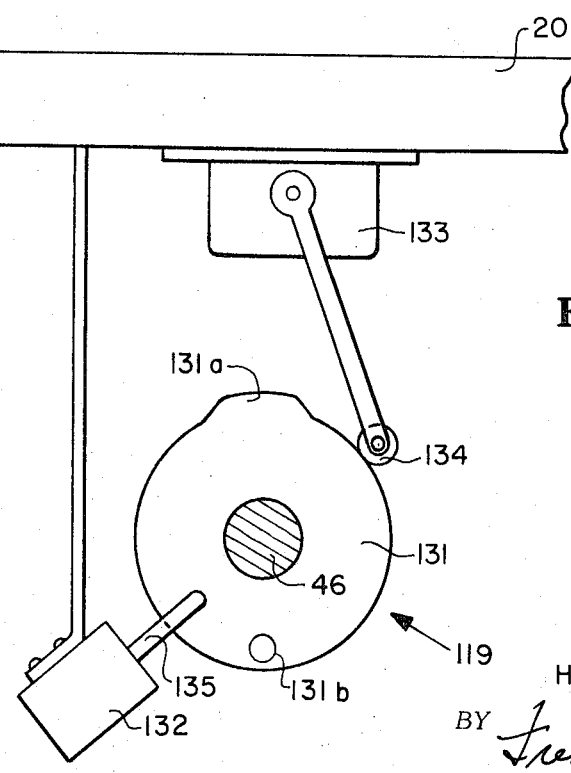
FIG. 12 is an elevation view of a cam and switch assembly.

The stop action mechanisms comprise that portion of knife assembly 73 which serves to keep the blade 85 and shear bar 87 separated as hereinbefore described, photocell 31 and corresponding light source 31a whose locations were described above in connection with FIG. 3, clutch assembly 118 shown in FIG. 10 and in more detail in FIG. 11, and cam and switch assembly 119 shown in FIG. 12.

Referring specifically to FIGS. 10 and 11, the clutch assembly includes an input sprocket 120 (not shown in FIG. 10) to tape feed section 22 input shaft 49, ratchet 121, pawl 122, hub assembly 123, bearings 124 (not shown in FIG. 10), tape feed driving sprocket 125, gear 126 (not shown in FIG. 10), air-operated actuator 127 (not shown in FIG. 11), and actuator shoe 128. Ratchet 121 is pinned or keyed to rotate with input shaft 49, and the subassembly comprising pawl 122, hub assembly 123 and tape feed driving sprocket 125 is journaled to shaft 49 by bearings 124. Gear 126 is keyed to shaft 49.

When clutch 118 is engaged, pawl 122 engages ratchet 121 and hub assembly 123 rotates with shaft 49 to deliver power to differential unit 129 via chain 130, from which power is transmitted to the measuring roll 35 and compression roll 36 by gear train 128a (shown in FIG. 10). However, upon actuation of actuator 127, shoe 128 causes pawl 122 to disengage from ratchet 121 and simultaneously brakes hub assembly 123, thereby stopping power input to differential unit 129 while shaft 49 continuously rotates relative to hub assembly 123 on bearings 124.

The cam and switch assembly 119 shown in FIG. 12 is operated by conveyor 38 shaft 46 (see FIG. 1). The assembly comprises cam 131 and switches 132 and 133 which are secured to the machine frame 20 (see FIG. 1) by suitable brackets. Cam 131 is a circular plate having an arcuate lobe 131a of about 10° and a pin 131b located diametrically opposite the center of lobe 131a. Switch 133 is a normally open single pole single throw switch and is actuated by lobe 131a acting on roller 134. Switch 132 is a normally closed single pole single throw switch and is actuated by pin 131b acting on lever 135. In a switching cycle, switch 133 is actuated closed about 5° before switch 132 is opened and is held closed for about 5° after switch 132 recloses. The purpose of this arrangement is explained below in connection with FIG. 13.

Cam 131 is rotationally fixed to shaft 46 in a position such that switches 132 and 133 will be actuated as soap bars grouped in the infeed section 21 of the machine are scheduled to pass photocell 31 (see FIGS. 1 and 2). Thus switches 132 and 133 and photocell 31 are timed to act simultaneously in checking to see if a group of soap bars is about to enter the tape feed section 22.

The manner in which the controls mentioned above cooperate to control the stop action mechanisms of the tape feed section 22 is illustrated by FIG. 13. The electrical system comprises photoswitch 31b (which includes photocell 31, light source 31a, an amplifier to amplify the signals generated in photocell 31 by light source 31a, and a relay actuated switch which is open when the photocell is dark), normally open relay 136, power relay 137 (which has two normally open contacts 137a and 137b), push button switch 71 (which in the same start switch as that described for the circuit of FIG. 5), switches 132 and 133, and solenoid 138. When solenoid 138 is energized, it opens a valve which directs air pressure to actuate actuators 93 and 127 and stop action in tape feed section 22. When solenoid 138 is deenergized, the cited valve is positioned to bleed air pressure from actuators 93 and 127, thereby deactuating them and returning tape feed section 22 to normal operation. The switches are shown in their respective positions at machine start-up, with switches 132 and 133 being shown in their unactuated positions.

With the switches in the start-up position shown, each of the parallel circuits to relay 137 is open. Hence, relay contacts 137b are open and solenoid 138 is unenergized. Air is thus precluded from actuating actuator 127, thereby leaving clutch assembly 118 engaged (see FIG. 10) and air is precluded from actuating actuator 93, thereby leaving knife assembly 73 ready to cut (see FIG. 6).

When the machine is started, switch 71 is momentarily closed which momentarily actuates relay 137, thereby causing contacts 137a to close and lock relay 137 into engagement through switch 132. Simultaneously, contacts 137b close and energize solenoid 138, which causes clutch assembly 118 to disengage and causes knife assembly 73 to assume its inactive position.

When a bundle of bars reaches photoswitch 31b, it opens, allowing relay 136 to open. Simultaneously, switch 133 is closed, so that the net effect on the leg of the circuit containing those elements is nil, that leg still being open circuited. About five degrees after switch 133 is closed and while the presence of a soap bar bundle is still keeping relay 136 open, switch 132 is opened, thereby breaking the holding circuit on relay 137 and allowing contacts 137b to open, which deenergizes solenoid 138 and allows the tape to feed and the knife assembly 73 to cut. Thereafter, relay 137 will remain deenergized as long as soap bar bundles pass photoswitch 31b at the same time as switches 132 and 133 are actuated.

If, on the other hand, continuity in the passage of bundles past photoswitch 31b is broken, when switch 133 is closed, photoswitch 31b and relay 136 will be closed, thereby energizing relay 137, locking in relay 137 through contacts 137a, and stopping action in tape feed section 22 by energizing solenoid 138 through contacts 137b. When switch 132 is momentarily opened, relay 136 and switch 133 will both be closed so that relay 137 will remain energized. This state of the circuit is that achieved at initial startup and will remain until soap bars again pass photoswitch 31b in proper time and the circuit elements are actuated as described in the immediately preceding paragraph.

An additional control loop is required to secure accurate registration of the tape with the knife assembly 73 so that individual tapes 34a will be cut off at the proper place. A system which can be used is one in which the position of the knife assembly 73 in its cycle is compared with the corresponding position of the tape web 34 and which contains means for adjusting tape web 34 feed position to correct any discrepancies sensed. An example of one such system which can be purchased commercially is that manufactured by Electonic Machine Parts, Inc., College Point, N.Y., and designated as Model No. 102. The description below illustrates operation of the system hardware, functional circuitry, and the hardware's relation to the rest of the machine.

FIGS. 6 and 7 illustrate the mounting locations of the tape feed control sensing hardware and FIG. 14 is a functional electrical schematic of the system. A photoelectric sensor 139 is mounted in a position immediately preceding the measuring roll 35 along the edge of the tape web 34, which sensor is adapted to transmit an electric current to an amplifier 140 (see FIG. 14). If the web 34 is in the correct position with respect to the knife assembly 73, the amplified signal from the photosensor 139 is grounded as explained in the next paragraph and nothing further happens. If, however, the web is not in its correct position, the signal from the photosensor 139 triggers an electronically controlled relay system 141 and current is directed to the motor 142 to either advance or retard web 34 by putting motion into differential unit 129.

The knife position sensor 143 is shown mounted to the machine in FIG. 7. Sensor 143 is rotationally driven by a shaft 144 which is geared in time with the tape feed section 22, input shaft 49 and hence, in time with the knife assembly 73. Sensor 143 is of a type which will close a circuit to ground (as indicated diagrammatically in FIG. 14) the photo sensor signal described above if the web 34-knife assembly 73 relationship is correct, and allow the photosensor signal to call for corrective action in one of two directions by keeping either ground circuit P or Q open if the stated relationship is incorrect. The sensor 143 includes means to adjust the rotational position at which it will ground the amplified photosensor 139 signal so that the system can be initially adjusted before a production run on the machine.

SEALING SECTION

Figure 15:
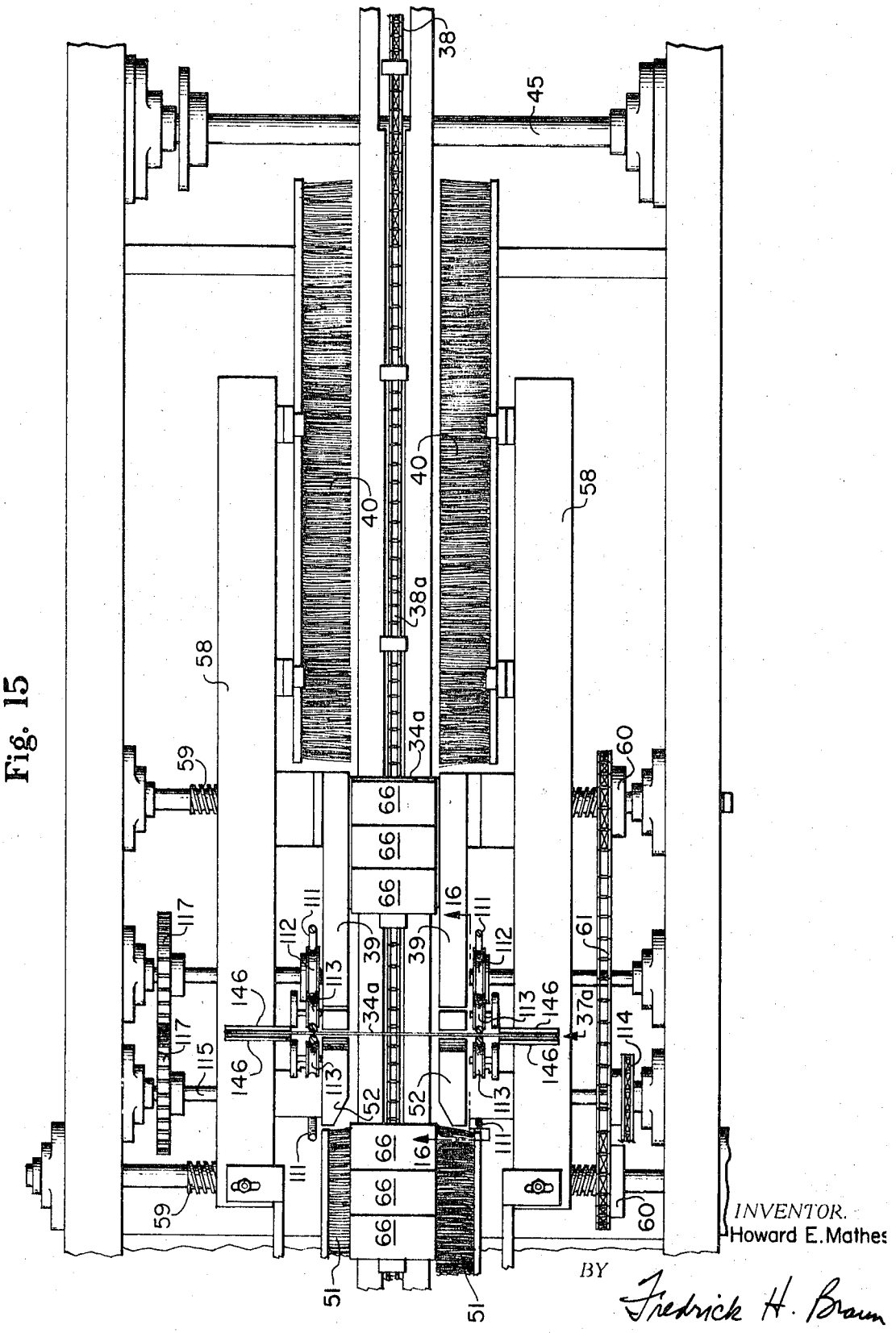
FIG. 15 is a partial plan view on an enlarged scale of the machine's sealing section.

FIG. 15 illustrates the primary components of the sealing section 23. Included are guide brushes 51 located upstream of the pickup station 37a and at the end of the infeed section 21, guides 52 which include a slot to support cutoff tape 34a in pickup station 37a, heating units 39, and compression brushes 40.

Guide brushes 51 and compression brushes 40 are standard brushes having medium stiffness bristles and may be obtained, for example, from Fuller Brush Company under Model Nos. 8B9041 and 8B9042, respectively.

Heating units 39 are standard electrical units such as, for example, those manufactured by Chromalox and designated as Model No. C-205. The machine as described is adapted to use a tape or wrapper having a thermoplastic wax coating which will adhere to the soap bar wrappers upon heating to a temperature of about 175° to about 225° F. To accomplish this degree of heating at line speeds of about 150 bundles per minute, the heating units should have a power rating of from about 75 to about 125 watts.

Other types of sealing arrangements could be employed with the machine, such as means using various adhesives preapplied to the tape wrapper and activated by moistening. In such a case, changes would have to be made in the machine to accommodate such means, changes of this type being within the skill of the ordinary packaging engineer.

Referring now to both FIGS. 15 and 16, the pickup station comprises guides 52, each of which include a slot 145 which is perpendicular to the plane of conveyor 38 to support the cutoff tape 34a, and guide plate 146 (shown in FIG. 15 only) to support the outer ends of the tape 34a. As shown in FIG. 15, slot 145 includes a diverging section 147 to facilitate entry of tape 34a into pickup station 37a. An adjustable stop 148 is provided to vertically position the tape in slot 145. Stop 148 can be vertically positioned by turning adjustment screw 149 until the desired position is achieved.

An operational cycle of the sealing section 23 comprises placement of the cutoff tape 34a in pickup station 37a with its smallest dimension vertical and its longest dimension extending transversely of conveyor 38, contact of a group of bars 66 with the tape 34a after it is resting against stops 148 forcing the tape 34a around the front bar 66 and into contact with the vertical edge of bars 66 as they pass through guides 52 and into the heating station, heating of the thermoplastic wax or tape 34a by heating units 39 to cause adhesion of tape 34a to bars 66, compression and smoothing of tape 34a against bars 66 by brushes 40, and discharge of the finished bundle from conveyor 38. The bundles are then transported, mechanically or otherwise, to a packing station to be packed into shipping containers.

The invention described herein can have many variations and it is not intended to limit its scope to the particular embodiment described, all reasonable equivalents thereof being within the scope of this invention.

What is claimed is:

1. A bundling machine comprising:
(A) a structural frame;
(B) a conveyor system supported by said structural frame and running substantially the length thereof, said conveyor system including a continuously running infeed conveyor and including a tape pickup station;
(C) means for cutting individual tapes from a continuous web and depositing said tapes in said pickup station;
(D) means for grouping individual articles into bundles, said means comprising at least one pair of claimps mounted to said structural frame, said clamps being in lateral alignment on said machine and located on opposite sides of said infeed conveyor; and control means for selectively actuating said clamps comprising a switching device actuated by a cam on one of the shafts of said conveyor system and adapted to release said clamps in timed relation to the deposit of tapes in said pickup station, reset switch means mounted to said framework downstream of the downstream edge of said clamps a distance equal to the length of the group of articles to be bundled, said reset switch means being adapted to sense when a group of articles has cleared said clamps and to reclose said clamps in response thereto, and means upstream of said clamps for sensing an absence of sufficient articles to form a complete bundling group and overriding said cam actuated switching device thereby precluding a release of the group in said clamp to said pickup station;
(E) means for preventing tape feed to said pickup station when a group of articles to be bundled is not released from said clamps;
(F) means for applying said tapes to the group of articles to be bundled; and
(G) means for sealing said tapes to each article in a group.

2. A machine for bundling articles comprising:
(A) a structural framework;
(B) a conveyor system supported by said structural framework and running substantially the length thereof to convey articles through said machine in a straight path; said conveyor system including a wrapper pickup station intermediate the ends of said path;
(C) a tape feed mechanism including means for forwarding a web from a roll of tape, said roll being mounted such that said web is withdrawn toward said wrapper pickup station, means for measuring and cutting individual bundling tapes such that the long dimension of the bundling tape is cut transverse to the length of the web, and means for subsequently depositing said tapes in said pickup station such that the long dimension of each successive tape is transversely held in position above said conveyor system;
(D) means forming individual articles into groups of at least two articles to be bundled, means for separately releasing each group for movement to the pickup station by said conveyor system in timed relation with the deposit of a bundling tape therein;
(E) means for applying said tapes across the front of the leading surface of the first article in said group and subsequently around the side surfaces of the articles in the group; and
(F) means for sealing said tapes to each of said articles in a bundle.

3. A machine for bundling articles comprising:
(A) a structural framework;
(B) a conveyor system supported by said framework and running substantially the length thereof to convey articles through said machine in a straight path, said conveyor system including a tape pickup station which comprises a pair of guide blocks oppositely disposed on each side of the path of said conveyor system, said guide blocks each having a slot cut therein perpendicular to the plane of said conveyor system and including a tape stop whereby an individual bundling tape can be deposited in said slots from above and positioned in predetermined relation to said conveyor system;
(C) means for cutting said individual bunding tapes as required from a printed web in registration with the printing thereon and means for subsequently delivering said tapes to said stops in said pickup station such that the tape is supported transversely above said conveyor system;
(D) means for grouping individual articles into bundles to be wrapped and releasing each bundle to said pickup station so that said bundle reaches said pickup station after an individual bundling tape comes to rest therein;
(E) means for applying said tape to the group of articles to be bundled whereby the printing on said individual tape is substantially identically positioned on each bundle; and
(F) means for sealing said tape to each of said articles in a bundle.

4. A cutoff knife comprising:
(A) structural support means;
(B) a laterally spaced pair of identical four bar linkages, each linkage comprising,
(1) a crank secured to a shaft, said shaft being journaled to said structural means;
(2) a cutter link pivotally connected at its one end to said crank, said cutter link having an angled extension;

(3) a support link pivotally connected at its first end to said cutter link at a point spaced from said one end and preceding said angled extension; and (4) a fixed link which includes a movable pivot mechanism comprising a lever secured at one end to a shaft which is journaled to said structural support means and pivotally connected at its other end to the second end of said support link;

(C) a two position actuator pivotally connected at its one end to said structural support means and at its other end to a link which is secured to the shaft commonly secured to said levers;

(D) a knife blade extending transversely of the plane of said four bar linkages and fastened at its ends to the angled extension of said cutter link; and (E) a shear bar extending transversely of the plane of said four bar linkages and fastened at its ends to said support links, said shear bar and said knife blade being located on their respective supports so that they will overlap during a portion of the rotational cycle of said crank when said actuator is in its first position and will not overlap during any portion of the rotational cycle of said crank when said actuator is in its second position.

5. The bundling machine recited in claim 1 wherein the control means for actuating said clamps is an electric circuit comprising:

(A) a power relay having two normally open contacts;

(B) a solenoid operated air valve for actuating said clamps, said solenoid being connected in series with a power source and the first set of contacts in said power relay;

(C) a start switch connected to a D.C. power source in series with the coils of said power relay;

(D) a first control relay having a normally open contact which is paralleled with said start switch;

(E) a cam actuated, normally-closed switch connected to said D.C. power source in series with the second set of contacts in said power relay and with the coils of said power relay, said cam-actuated switch being actuated by a cam on one of the shafts in said conveyor system in timed relation to the deposit of tapes in said pickup station;

(F) a second control relay having a normally open contact which is paralleled with said cam actuated switch;

(G) a normally open reset switch connected in series with a D.C. power source and the coils of said first control relay; said reset switch being mounted to said framework adjacent said infeed conveyor downstream from the downstream edge of said clamps a distance about equal to the length of a group of articles to be bundled, said reset switch being responsive to the presence of a group of said articles; and (H) a plurality of normally open override switches connected in parallel with each other and in series with a D.C. power source and the coils of said second control relay; said override switches being mounted to said framework adjacent said infeed conveyor immediately upstream of said clamps, said override switches each being responsive to absence of an article to be bundled from its location.

6. The bundling machine recited in claim 5 wherein said reset switch is a dark actuated photoswitch and said override switches are light actuated photoswitches.

7. A bundling machine comprising:

(A) a strucural framework;

(B) a conveyor system supported by said structural framework and running substantially the length thereof, said conveyor system comprising an infeed conveyor comprising upper and lower belts adapted to transport the articles to be bundled with their smallest surface parallel to the plane of the conveyors, and a flighted conveyor in series with and downstream of said infeed conveyor; said conveyor system including a wrapper pickup station comprising a pair of guide blocks oppositely disposed on each side of said flighted conveyor, said guide blocks each having a slot cut therein perpendicular to the plane of said flighted conveyor, each of said guide blocks including a fixed stop at the bottom of said slot;

(C) a tape feed mechanism comprising a rolled web of tapes oriented with their longest dimension parallel to the axis of the roll and transverse of said conveyor system, means for measuring and cutting individual tapes to their shortest dimension from said web, said cutting means located above said guide blocks, and means for depositing said tapes in said pickup station with their longest side transverse of said conveyor system, said means for depositing said tape in said pickup station comprising two laterally spaced pairs of transfer belts directly below said cutting means, the belts in a pair being in contact with each other above the said guide blocks and diverging from each other at the top of said guide blocks;

(D) means for grouping individual articles into bundles to be wrapped and releasing them to the pickup station in timed relation with the deposit of tapes therein;

(E) means for applying said tapes across the front of said bundle and across the edges of said articles which edges are parallel to the plane of the conveyor system; and (F) means for sealing said tapes to each of said articles in a bundle.

8. A bundling machine comprising:

(A) a structural framework;

(B) a conveyor system supported by said framework and running substantially the length thereof, said conveyor system comprising a continuously running infeed conveyor and a flighted conveyor downstream of and in series with said infeed conveyor, said conveyor system including a tape pickup station located on said flighted conveyor which comprises a pair of guide blocks oppositely disposed on each side of a conveyor, said guide blocks each having a slot cut therein perpendicular to the plane of the conveyor and including a stop whereby a tape can be deposited in said slot and positioned in a predetermined relation to the conveyor;

(C) means for cutting individual tapes from a printed web and depositing said tapes against said stops in said pickup station transversely of said conveyor system;

(D) means for grouping individual articles into bundles to be wrapped and releasing the said bundles to the pickup station so that a bundle reaches the pickup station after a tape comes to rest therein, said means for grouping and releasing bundles to said pickup station comprises at least one pair of clamps oppositely disposed on each side of said infeed conveyor, control means for selectively actuating said clamps comprising a switching device actuated by a cam on one of the shafts of said conveyor system and adapted to release said clamps in timed relation to the flights of said flighted conveyor, reset switch means mounted to said framework downstream of the downstream edge of said clamps a distance equal to the length of the group of articles to be bundled, said reset switch means being adapted to sense when a group of articles has cleared said clamps and to reclose said clamps in response thereto, and means upstream of said clamps for sensing an absence of sufficient articles to form a complete bundling group and override said cam actuated switching device;

(E) means for timing the flights on said flighted conveyor to arrive at said pickup station after deposit of a tape therein;
(F) means for applying said tapes to the group of articles to be bundled; and
(G) means for sealing said tape to each of the articles in a bundle.

9. The cutoff knife recited in claim 4 wherein, when the said actuator is in its first position, the linkages recited have the proportions:
   (A) crank throw equals 1,
   (B) pivot to pivot length of the said cutter link equals 4,
   (C) pivot to pivot length of the said support link equals 5.78,
   (D) the distance from the distal pivot of said lever to the center of said crank shaft equals 4.27,
   (E) the horizontal offset of the center of said crank shaft from the journal center of said lever equals 2.48,
   (F) the pivot to pivot length of said lever equals 1.9, and
   (G) the vertical distance from the journal center of said lever to the center of said crank shaft equals 3.54.

10. The cutoff knife recited in claim 9 wherein the leading edge of said knife blade is located on a line passing through the juncture of said cutter link and said support link which line is perpendicular to the line joining the pivots for said cutter link, the distance of said leading edge from said juncture being 3.53 times the crank throw.

11. A bundling machine comprising:
   (A) a structural frame;
   (B) a conveyor system supported by said structural frame and running substantially the length thereof, said conveyor system comprising a continuously running infeed conveyor with upper and lower belts adapted to transport the articles to be bundled with their smallest surface parallel to the plane of the conveyors, and a flighted conveyor in series with and downstream of said infeed conveyor; said conveyor system including a pickup station comprising a pair of guide blocks oppositely disposed on each side of said flighted conveyor, said guide blocks each having a slot cut therein perpendicular to the plane of said flighted conveyor, each said guide block including an adjustable stop at the bottom of said slot;
   (C) a tape feed mechanism comprising a rolled web of tapes oriented with their longest dimension parallel to the axis of said roll and transverse of said conveyor system and means for feeding a measured length of said web to a cutoff means;
   (D) a cutoff knife comprising;
      (1) a structural support means;
      (2) a laterally spaced pair of identical four bar linkages, each linkage comprising a crank secured to a shaft, said shaft being journaled to said structural support means; a cutter link pivotally connected at its one end to said crank, said cutter link having an angled extension; a support link pivotally connected at its first end to said cutter link at a point spaced from said one end and preceding said angled extension; and a fixed link which includes a movable pivot mechanism comprising a lever secured at one end to a shaft which is journaled to said structural support means and commonly secured to the opposite side lever, and piovtally connected at its other end to the second end of said cutter link;
      (3) a two position actuator pivotally connected at its one end to said structural support means and at its other end to a link which is secured to the shaft secured to said levers;
      (4) a knife blade extending transversely of the plane of said four bar linkages and fastened at its ends to the angled extensions of said cutter link; and
      (5) a shear bar extending transversely of the plane of said four bar linkages and fastened at its ends to said support links, said shear bar and said knife blade located on their respective supports so that they will overlap during a portion of the rotational cycle of said crank when said actuator is in its first position and will not overlap during any portion of the rotational cycle of said crank when said actuator is in its second position;
   (E) means for depositing a cut tape in said pickup station comprising two laterally spaced pair of transfer belts located directly below said cutoff knife and directly above said pickup station, the belts in a pair being in contact with each other above the said guide blocks and diverging from each other at the top of said guide blocks;
   (F) means for grouping individual articles into bundles comprising at least one pair of clamps mounted to said structural frame, said clamps being in lateral alignment on said machine and located on opposite sides of said infeed conveyor; and control means for selectively actuating said clamps comprising a switching device actuated by a cam on one of the shafts of said conveyor system and adapted to release said clamps in timed relation to the flights of said flighted conveyor, reset switch means mouned to said framework downstream of the downstream edge of said clamps a distance equal to the length of the group of articles to be bundled, said reset switch means being adapted to sense when a group of articles has cleared said clamps and to reclose said clamps in response thereto, and means upstream of said clamps for sensing an absence of sufficient articles to form a complete bundling group and override said cam actuated switching device, thereby precluding release of the group in said clamp to said flighted conveyor;
   (G) means for timing the tape feed mechanism so that a cut tape will come to rest in said pickup station immediately before a fight in a flighted conveyor reaches the said pickup station;
   (H) means for preventing tape feed to said pickup station when a group of articles to be bundled is not released from said clamps;
   (I) means for applying said tapes to the group of articles to be bundled; and
   (J) means for sealing said tape to each article in a group.

References Cited
UNITED STATES PATENTS

| 2,369,253 | 2/1945 | Robinson et al. | 83—304X |
| 2,882,657 | 4/1959 | Fahrenbach | 53—73X |
| 2,982,065 | 5/1961 | Giles et al. | 53—159 |

TRAVIS S. McGEHEE, Primary Examiner

53—137, 159, 196; 83—304